(12) United States Patent
Arnold

(10) Patent No.: US 7,958,727 B2
(45) Date of Patent: Jun. 14, 2011

(54) ELECTRIC BOOST COMPRESSOR AND TURBINE GENERATOR SYSTEM

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 1162 days.

(21) Appl. No.: 11/321,391

(22) Filed: Dec. 29, 2005

(65) Prior Publication Data
US 2007/0151241 A1    Jul. 5, 2007

(51) Int. Cl.
F02B 33/44    (2006.01)
(52) U.S. Cl. .................... 60/605.1; 123/559.1
(58) Field of Classification Search ............ 60/607–609, 60/602, 612
See application file for complete search history.

(56) References Cited

U.S. PATENT DOCUMENTS

| | | | | |
|---|---|---|---|---|
| 5,038,566 A | * | 8/1991 | Hara | 60/608 |
| 5,881,559 A | * | 3/1999 | Kawamura | 60/597 |
| 6,079,211 A | * | 6/2000 | Woollenweber et al. | 60/612 |
| 6,604,360 B1 | * | 8/2003 | Vuk | 60/597 |
| 6,647,724 B1 | * | 11/2003 | Arnold et al. | 60/608 |

FOREIGN PATENT DOCUMENTS

| | | |
|---|---|---|
| EP | 0755816 | 1/1997 |
| JP | 59141712 | 8/1984 |
| WO | WO2004011791 | 2/2004 |
| WO | WO2005026517 | 3/2005 |

OTHER PUBLICATIONS

PCT ISR/WO Honeywell PCT/US2006/046871.

* cited by examiner

Primary Examiner — Thomas Denion
Assistant Examiner — Douglas J. Duff
(74) Attorney, Agent, or Firm — Brian Pangrle

(57) ABSTRACT

An exemplary system for an internal combustion engine includes an exhaust turbine operably coupled to a generator, an intake air compressor operably coupled to an electric motor and mechanically decoupled from the exhaust turbine and a controller to direct electricity generated by the generator to one or more members of the group consisting of the electric motor, an additional electric motor, and a power storage. Various other exemplary technologies are also disclosed.

14 Claims, 10 Drawing Sheets

ELECTRIC BOOST COMPRESSOR AND TURBINE GENERATOR SYSTEM

TECHNICAL FIELD

Subject matter disclosed herein relates generally to systems that include an exhaust turbine for internal combustion engines where, for example, the exhaust turbine is coupled to a generator.

BACKGROUND

Exhaust turbines find use in turbocharging and turbocompounding of internal combustion engines. With respect to turbocharging, an exhaust turbine is typically coupled mechanically via a shaft to an intake air compressor. With respect to turbocompounding, a conventional turbocharger is typically used in conjunction with an additional exhaust turbine where a mechanical or hydraulic linkage exists between the additional exhaust turbine and a crankshaft. Various exemplary technologies disclosed herein use and/or control an exhaust turbine for generation of electricity. In turn, such electricity may be directed to a power storage, an electric motor, etc.

SUMMARY

An exemplary system for an internal combustion engine includes an exhaust turbine operably coupled to a generator, an intake air compressor operably coupled to an electric motor and mechanically decoupled from the exhaust turbine and a controller to direct electricity generated by the generator to one or more members of the group consisting of the electric motor, an additional electric motor, and a power storage. Various other exemplary technologies are also disclosed.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Turning to the drawings, various methods are illustrated as being optionally implemented in a suitable control and/or computing environment, for example, in the general context of computer-executable instructions, such as program modules, being executed by a computer and/or other computing device. Generally, program modules include instructions, routines, programs, objects, components, data structures, etc.

In some diagrams herein, various algorithmic acts are summarized in individual "blocks". Such blocks describe specific actions or decisions that are made or carried out as a process proceeds. Where a controller (or equivalent) is employed, the flow charts presented herein provide a basis for a "control program" or software/firmware that may be used by such a controller (or equivalent) to control a device and/or a system. As such, various processes may be implemented as machine-readable instructions storable in memory that, when executed by a processor, perform various acts illustrated as blocks. In addition, various diagrams include individual "blocks" that are optionally structural elements of a device and/or a system. For example, a "controller block" optionally includes a controller as a structural element, a "detector block" optionally includes a detector as a structural element, a "turbocharger block" optionally includes a turbocharger as a structural element, etc.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the controllers and, additionally, any and all computer-readable media on which such software might be embodied. Examples of such computer-readable media include, without limitation, floppy disks, hard disks, CDs, RAM, ROM, flash memory and the like.

Figure 1:
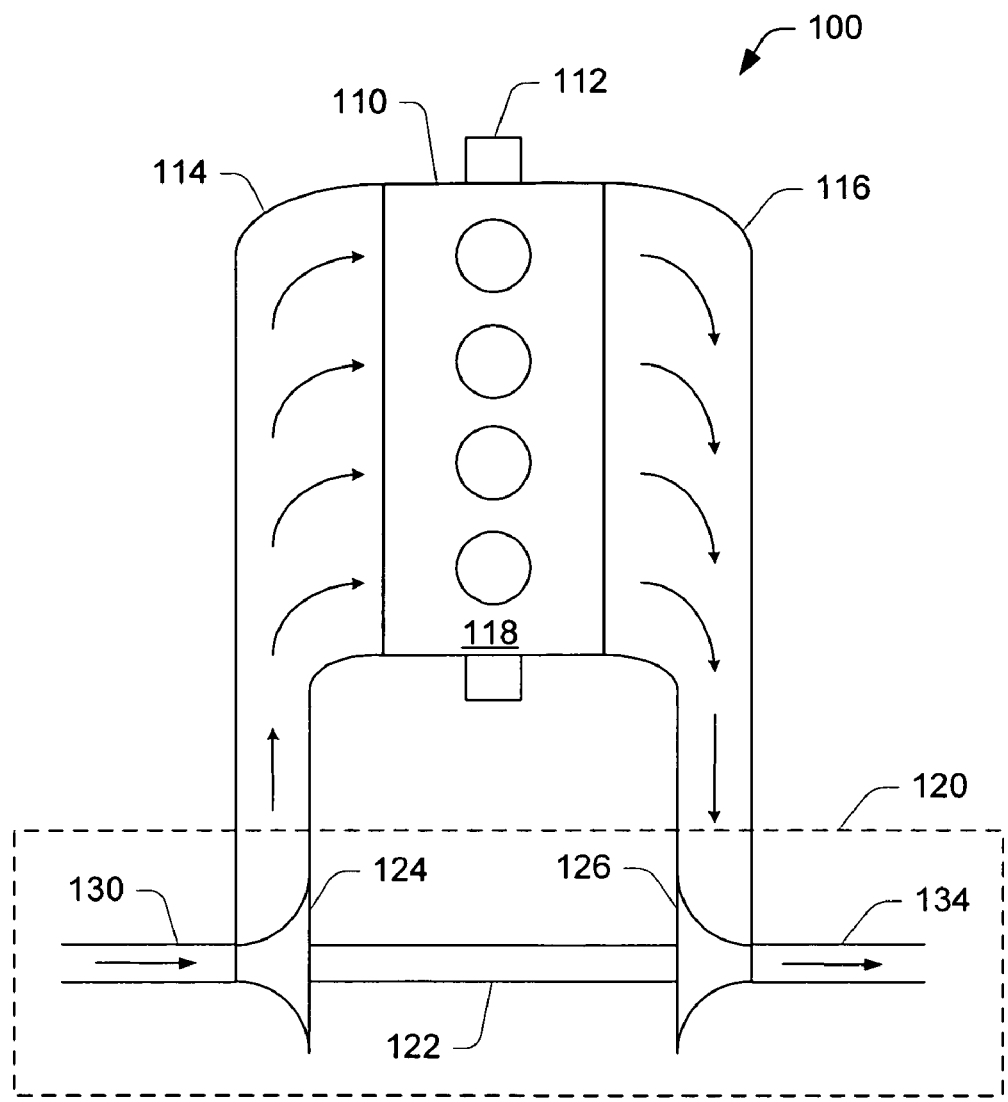
FIG. 1 is a simplified approximate diagram illustrating a prior art turbocharger system for an internal combustion engine.

Turbochargers are frequently utilized to increase the power output of an internal combustion engine. Referring to FIG. 1, a prior art power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 130, a shaft 122, a compressor stage 124, a turbine stage 126 and an exhaust outlet 134. Such a turbocharger may include an optional variable geometry unit and a variable geometry controller, which may use multiple adjustable vanes, a wastegate or other features to control the flow of exhaust (e.g., variable geometry turbine) or inlet air (e.g., variable geometry compressor).

In general, the turbine stage 126 includes a turbine wheel housed in a turbine housing and the compressor stage 124 includes a compressor wheel housed in a compressor housing where the turbine housing and compressor housing connect directly or indirectly to a center housing. The center housing typically houses one or more bearings that rotatably support the shaft 122, which is optionally a multi-component shaft.

Figure 2:
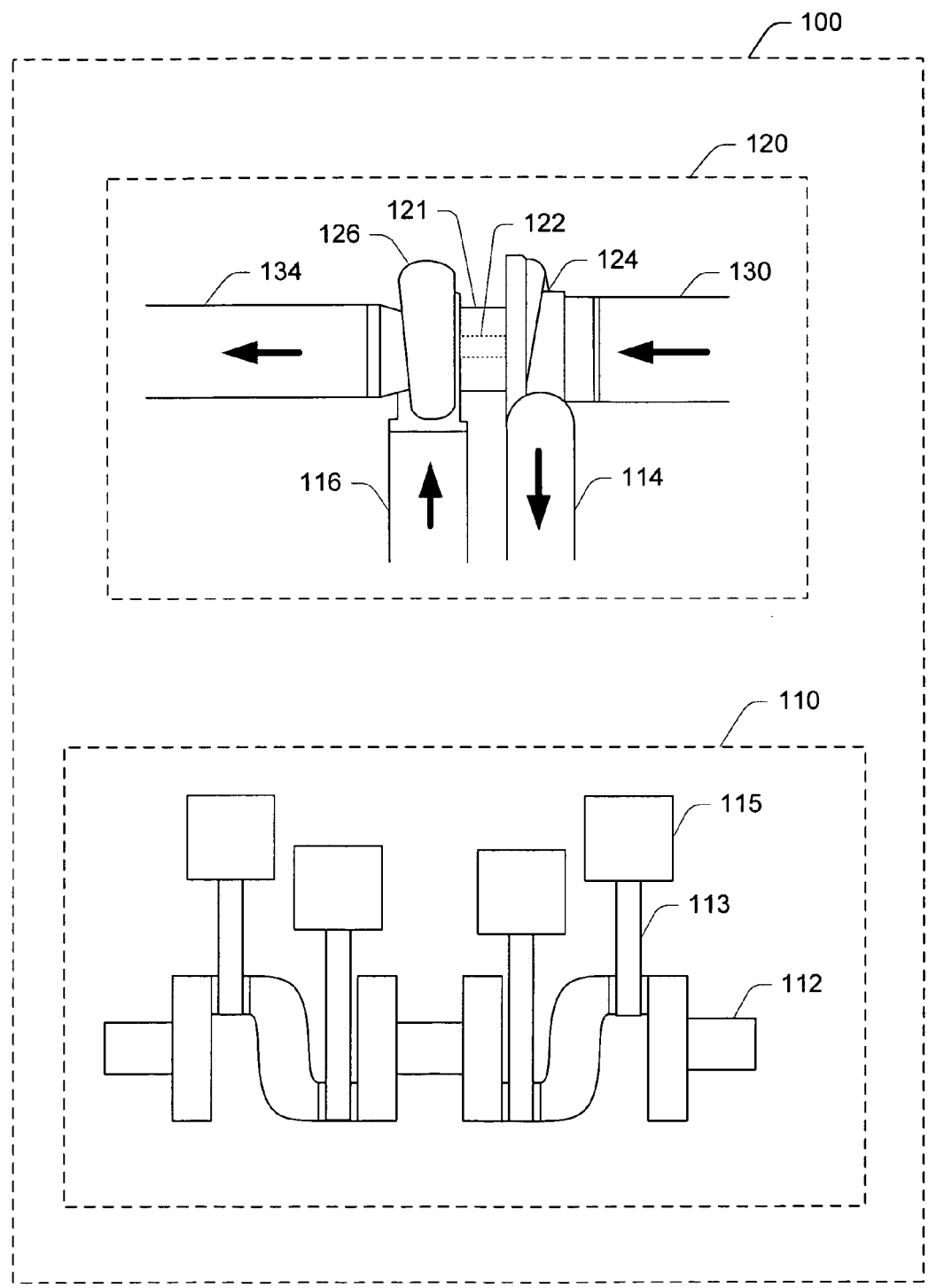
FIG. 2 is another representation of the prior art turbocharger system and internal combustion engine of FIG. 1.

FIG. 2 shows another view of the system 100. The internal combustion engine 110 includes a plurality of pistons 115 operably connected to the shaft 112 (e.g., a crankshaft) by a plurality of connecting rods 113. As the crankshaft 112 rotates, various pistons 115 force exhaust out of their respective combustion chambers. The turbine 126 then receives the exhaust via the passage 116, which drives the shaft 122. As shown in FIG. 2, the shaft 122 passes through a center housing 121 disposed between the turbine 126 and the compressor 124. Rotation of the shaft 122 causes the compressor 124 to compress inlet air, which is provided to combustion chambers of the internal combustion engine 110 via the passage 114.

Figure 3:
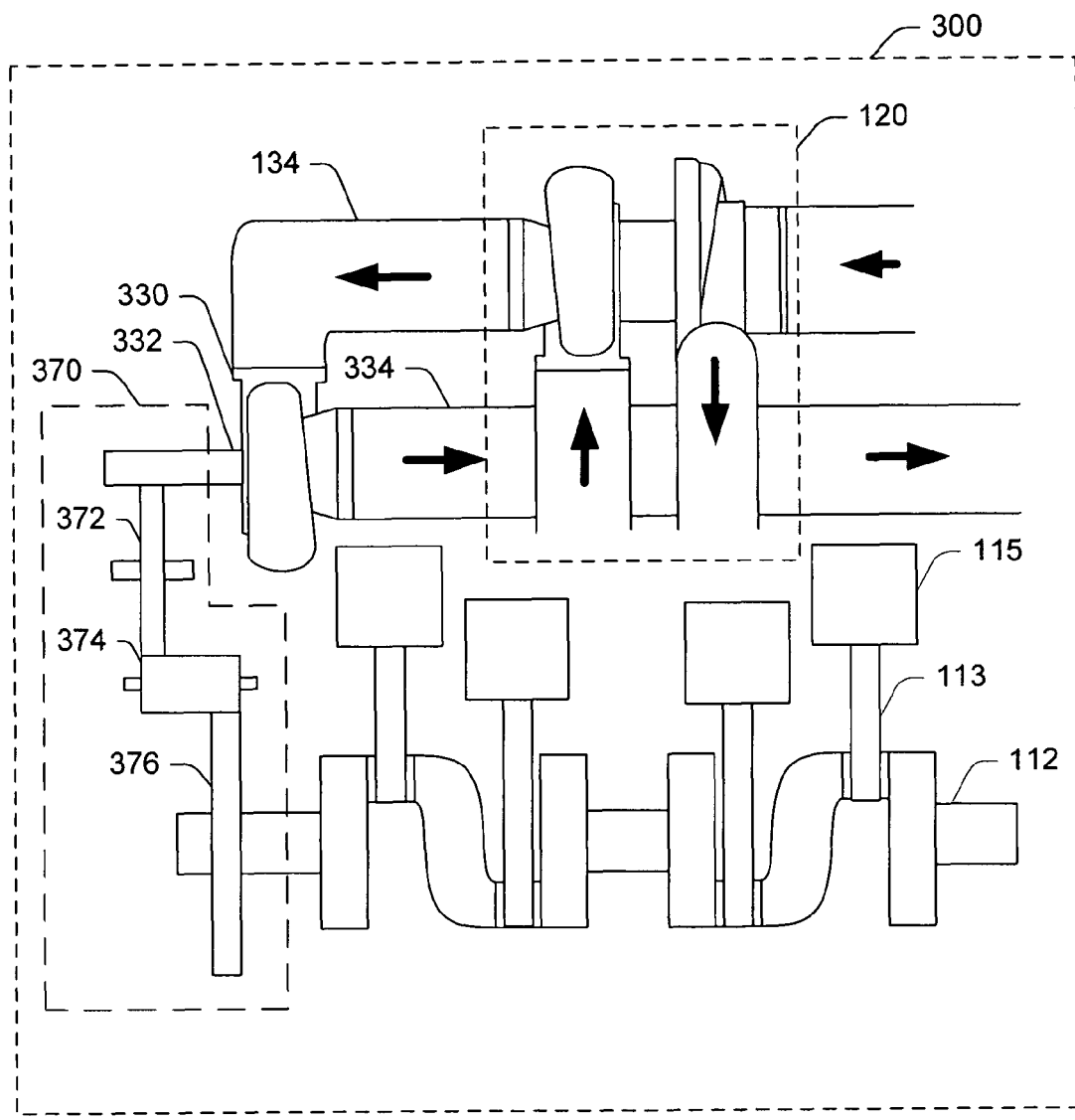
FIG. 3 is a diagram illustrating a prior art turbocompounding system.

FIG. 3 shows a conventional turbocompounding system 300. This conventional system relies on two turbines, one associated with the turbocharger 120 and an additional turbine 330. The turbine 330 is operably connected via a mechanical linkage 370 to the crankshaft 112 of an internal combustion engine. More specifically, the turbine 330 receives exhaust from the outlet 134 of the turbocharger, extracts residual energy from the exhaust and then provides it to the mechanical linkage 370. The exhaust passing through the turbine 330 exits via the passage 334.

The mechanical linkage 370 is typically a type of transmission that transmits energy from the turbine 330 to the crankshaft 112. For example, the mechanical linkage 370 includes a series of gears 372, 374, 376 operably connected to a shaft 332 of the turbine 330. The mechanical linkage 370 may transfer energy to increase the momentum of the crankshaft 112 or other moving component of an internal combustion engine. Noting that some conventional turbocompounding systems use hydraulic as well as mechanical linkages.

In general, a conventional turbocompounding turbine rotates at high speed which generates inertia. Conventional diesel engines are prone to torsional vibration of the crankshaft and, for turbocompounding, a hydraulic coupling is often used to dampen torsional vibration. Such hydraulic coupling may be required for some conventional applications to reduce or eliminate gear noise or to reduce or eliminate gear failure from excessive loading.

Conventional turbocompounding comes at a cost, however, as operation of the turbine 330 introduces backpressure. Further, efficiency and operational concerns of the additional turbine 330 need to be addressed with respect to exhaust temperature, which can have repercussions on emissions. For example, a catalytic converter for treating exhaust may not operate as effectively at a reduced exhaust temperature. Thus, to maintain a desired emissions level, heating of the catalyst may be required. Overall, turbocompounding that uses multiple turbines (120, 330) and mechanical (370) and/or hydraulic linkages has associated disadvantages.

As described herein, various benefits typically associated with conventional turbocompounding 300 are achieved using a system that includes an electrical generator coupled to a turbine and an electrical motor. Such a system may further include a compressor driven by an electrical motor. Such an exemplary system decouples various conventional mechanical and/or hydraulic linkages and provides for transmission of energy using electricity (e.g., electrical linkages) that allow for implementation of a richer variety of control algorithms. Such control algorithms may increase performance, reduce emissions, etc.

Figure 4:
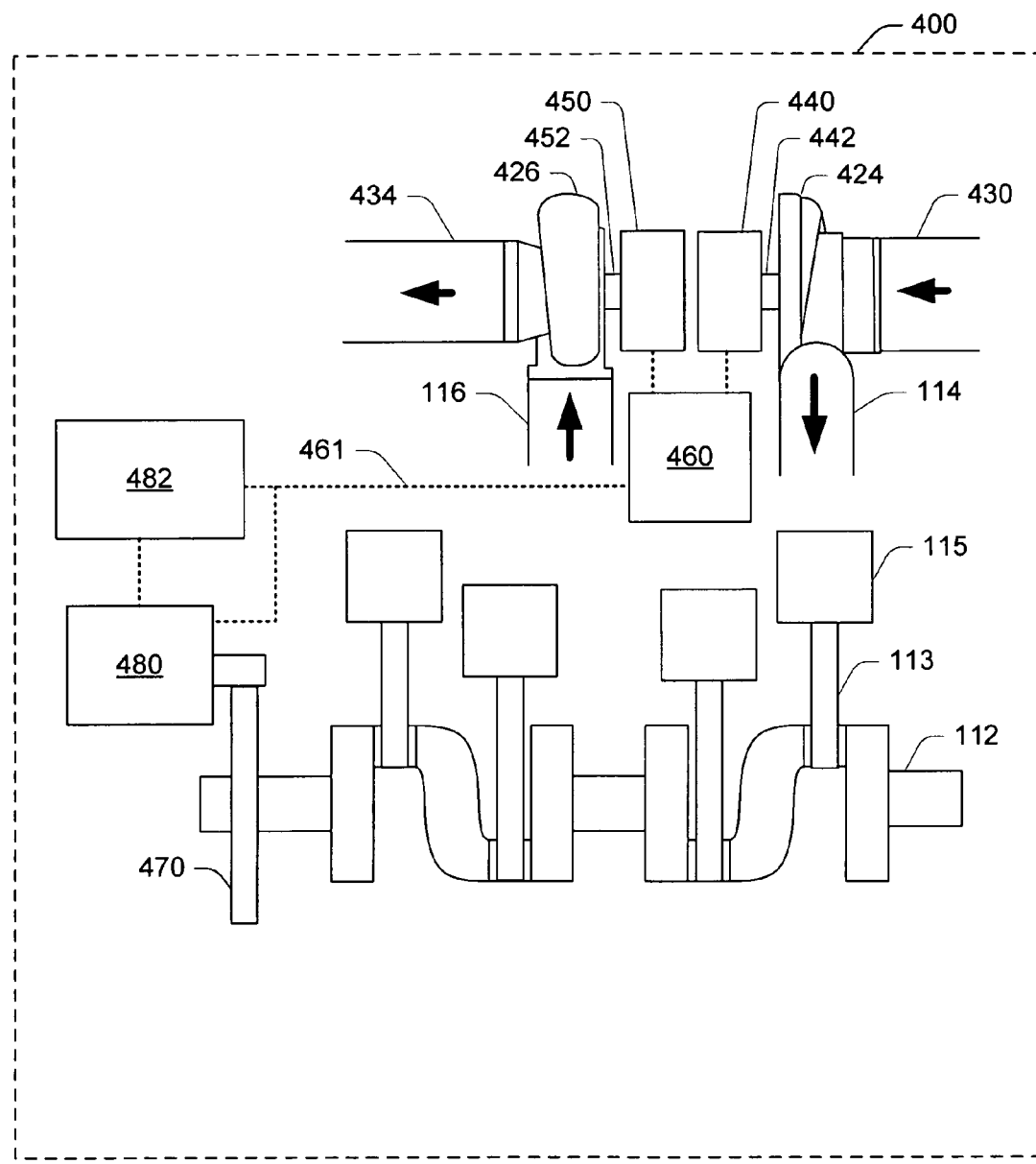
FIG. 4 is a diagram illustrating an exemplary system that includes a turbine coupled to a generator for directly or indirectly powering one or more electric motors.

FIG. 4 shows an exemplary system 400 that includes an exhaust turbine 426 for generating electricity and an electrically driven air compressor 424. A turbine shaft 452 couples the turbine 426 to a generator 450 and a compressor shaft 442 couples an electric motor 440 to the compressor 424. Electronic control circuitry 460 provides for receiving electricity from the generator 450, rectifying the received electricity to direct current (or other suitable form) and controlling the electric motor 440.

Electrical energy may be routed to the electric motor 440 from any of a variety of sources. For example, energy to power the electric motor 440 may be from a power storage 482 or from the generator 450. In either instance, the control circuitry or controller 460 may be used (also consider electrical circuitry 461). Further, electrical energy generator by the generator may be routed to the power storage 482.

The system 400 further includes another electric motor 480. The system 400 is optionally part of a conventional vehicle or optionally part of a hybrid vehicle that uses an electric motor. In the system 400, the electric motor 480 can be used directly or indirectly for propulsion. In this example, the electric motor 480 is coupled to the crankshaft 112 via a linkage 470, which may be direct (e.g., no intermediate gears) or indirect (e.g., via a hydraulic and/or mechanical transmission). In this example, energy from the controller 460 and/or the power storage 482 may supply the motor 480.

The motor 480 may operate in conjunction with the internal combustion engine (e.g., components 112, 113, 115) from exhaust generated electricity or other electricity (e.g., stored energy from power storage 482, etc.). The motor may optionally operate from stored energy in instances when the internal combustion engine does not generate exhaust (e.g., no combustion).

Various components of the system 400 can be positioned advantageously with respect to other components. For example, the compressor 424 may be located at a position where exhaust energy does not cause heating of the compressor 424 or heating of inlet air or compressed air. The motor 480 can be located remotely from the turbine 462 to, for example, reduce heat transfer from exhaust to the motor 480 or to reduce linkage requirements between the motor 480 and propulsion components.

Various components of the system 400 may be used for turbocompounding only. For example, turbocompounding only would not require use of the compressor 424 and associated components (e.g., 440, 442). An exemplary turbocompounding system includes more than one turbine (e.g., 426) where the turbines may be coupled to a single generator or to multiple generators. An exemplary turbocompounding system optionally includes more than one battery (e.g., 482) and optionally more than one motor (e.g., 480).

Figure 5:
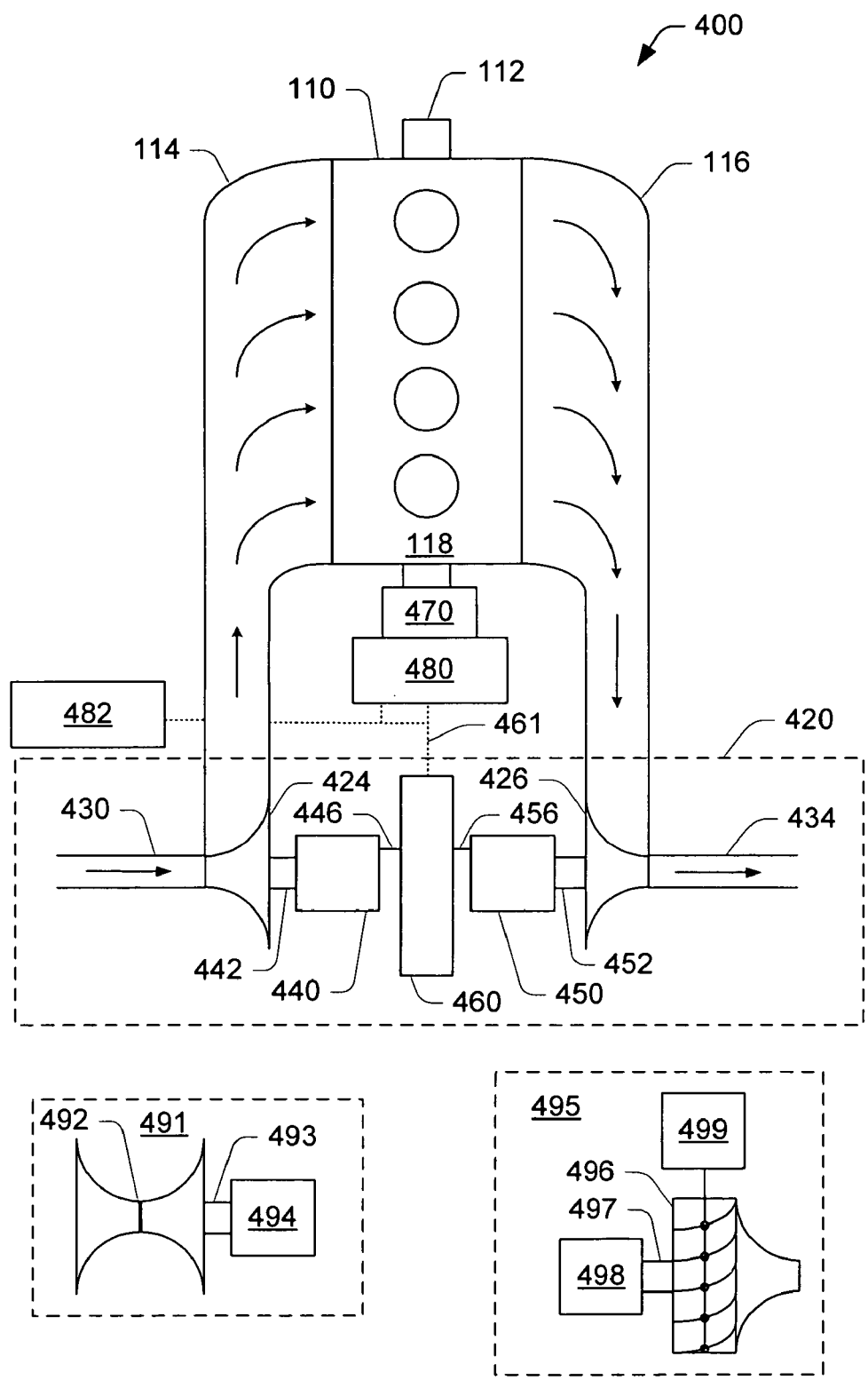
FIG. 5 is a diagram illustrating various components and optional components suitable for use in the system of FIG. 4.

FIG. 5 shows another diagram of the system 400 and two alternative turbine and/or compressor configurations 491, 495. The configuration 491 is a twin wheel device or two stage device coupled via a link 493 (e.g., a shaft or hydraulics) to a generator and/or motor 494. The configuration of the two wheels may be back to back, nose to nose, etc. A system may optionally use more than two turbine wheels and/or two compressor wheels. The configuration 496 is a variable geometry device with a variable geometry unit 496 and geometry controller 499 that may be used with a turbine or compressor that has a link 497 to a generator and/or motor 498. A twin wheel or two stage device may include one or more variable geometry units and controllers.

Motors suitable for driving a compressor are typically capable of outputting power at a level of up to approximately 20 HP to approximately 100 HP and/or capable of rotating a compressor wheel at a rate of up to approximately 250,000 rpm or more. Suitable motors may operate at a voltage of approximately 12 V to 600 V or more. The aforementioned power levels and speeds typically depend on compressor size (e.g., including number of wheels), in addition, larger size engines require higher power levels and lower speeds.

As shown in FIGS. 4 and 5, an exemplary system for an internal combustion engine 110 may include an exhaust turbine 426 operably coupled to a generator 450, an intake air compressor 424 operably coupled to an electric motor 440 and mechanically decoupled from the exhaust turbine and a controller 460 to direct electricity generated by the generator to the electric motor 440, an additional electric motor 480, and/or a power storage 482. A linkage 470 may link the additional electric motor 480 to a drivetrain (e.g., 112) drivable by the internal combustion engine 110. The controller 460 may also include control logic to direct electricity stored in the power storage 482 to the electric motor 440 and/or the electric motor 480.

As discussed below, an exemplary controller may use a power demand parameter that corresponds to power demand of an internal combustion engine. Such a controller may also use a power demand limit parameter that corresponds to a normally, aspirated power of an internal combustion engine. Such a power demand limit may depend at least in part on rpm of the internal combustion engine and/or one or more other variables. A controller may direct electricity to the electric motor of an air intake compressor based at least in part on the power demand parameter and the power demand limit parameter.

As described with respect to FIG. 5, the system 500 may include a variable geometry turbine 495. In such instances, the controller 460 may control the geometry of the variable geometry turbine. For example, control of the geometry can affect operation of the generator 450. In a similar manner, the controller may control geometry of a variable geometry compressor 495.

As described further below, a controller may include a processor and memory and instructions stored in the memory and executable by the processor. Such instructions may provide for control logic to direct electricity generated by the generator 450 and/or stored by the power storage 482. A controller may include control logic to direct electricity to the motor 480 at the end of an idle period of the internal combustion engine. For example, at the end of an idle stop, the controller may direct energy to the motor 480 to help propel a vehicle.

An exemplary system for a normally aspirated internal combustion engine may include an exhaust turbine operably coupled to a generator and a controller to direct electricity generated by the generator to one or more members of the group consisting of an electric motor and a power storage. Such a system may include the electric motor and a linkage to link the electric motor to a drivetrain drivable by the normally aspirated internal combustion engine. The turbine of a system for a normally aspirated internal combustion engine is optionally a variable geometry turbine where the controller may control the geometry of the variable geometry turbine.

An exemplary system for an internal combustion engine may include a turbocharger that includes an exhaust turbine mechanically coupled to an intake air compressor; an additional exhaust turbine, the additional exhaust turbine operably coupled to a generator; and a controller to direct electricity generated by the generator to one or more members of the group consisting of an electric motor and a power storage. Such a system may include the electric motor and a linkage to link the electric motor to a drivetrain drivable by the internal combustion engine.

Figure 6:
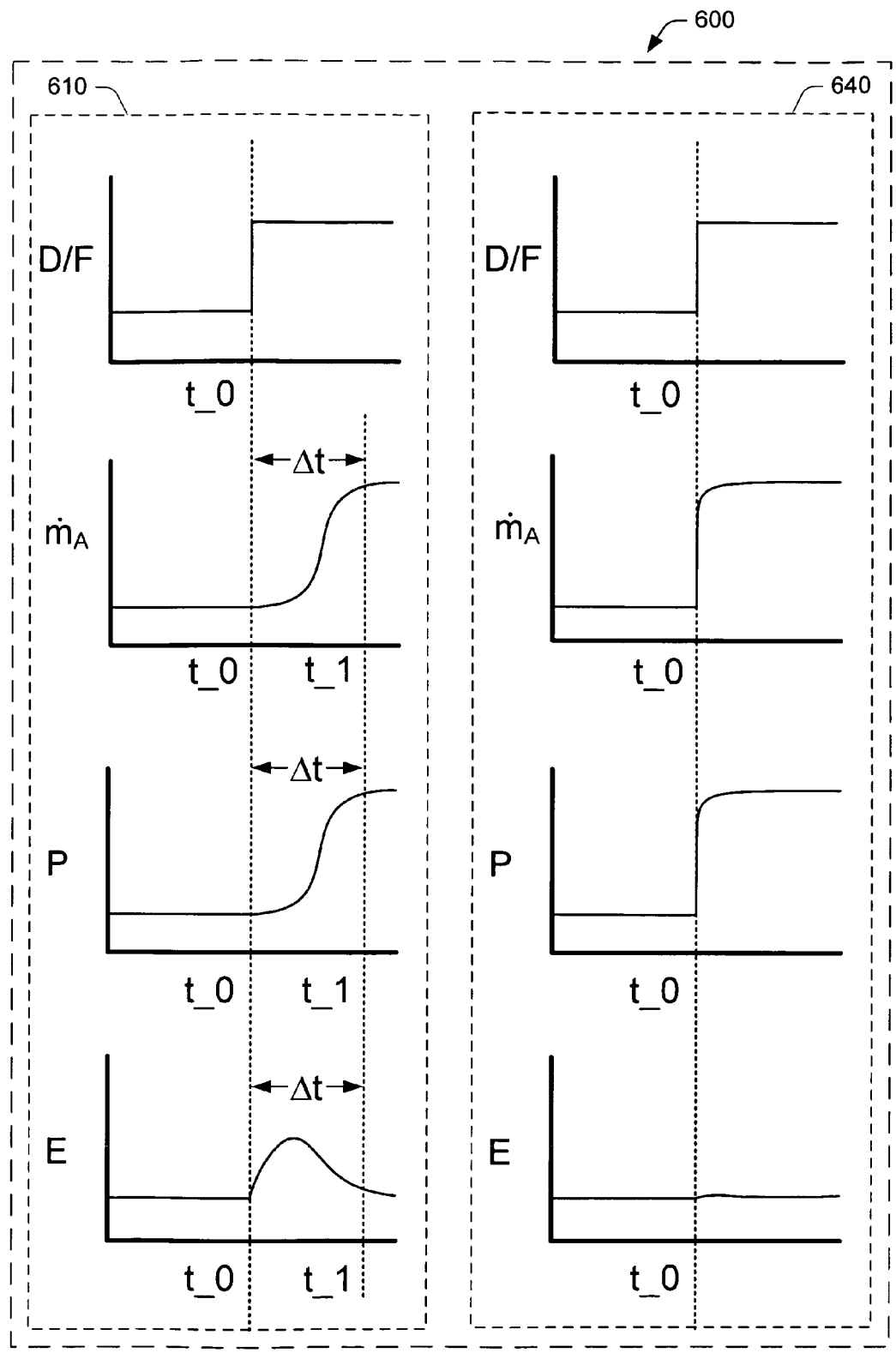
FIG. 6 is a series of plots that illustrate operational conditions and associated timings for a change in demand or fuel.

Various exemplary methods, devices, systems, etc., disclosed herein typically operate to enhance performance of an internal combustion engine. Performance includes, for example, power, torque, efficiency, emissions, etc. Referring to FIG. 6, exemplary simplified, approximate graphs 600 are shown for the turbocharged system 100 of FIG. 1 and for the exemplary boost and/or generation system 400 of FIGS. 4 and 5. One set of graphs labeled 610 is associated with the turbocharger 120 of FIG. 1 while another set of graphs labeled 640 is associated with the exemplary boost/generation system 400 of FIGS. 4 and 5.

Referring to the set of graphs 610, graphs for power demand and/or fuel flow with respect to time, airflow with respect to time, engine power with respect to time and emissions with respect to time are shown. Referring to the graph for demand and/or fuel flow (D/F) with respect to time, at a time of approximately t_0, demand and/or fuel flow increases. In response to the increase in demand and/or fuel flow, airflow (e.g., $m_A$ or mass air flow) increases, leveling off at a time of approximately t_1. In this example, an air flow time delay ($\Delta t_A$) exists between the time t_0 and the time t_1. Similarly, a time delay exists in engine power ($\Delta t_P$) and potentially in emissions ($\Delta t_E$). In turbocharged engines, such delays are often characterized as "turbo lag". Various exemplary methods, devices, systems, etc., described herein operate to reduce such time delays.

Referring to the set of graphs 640, an increase in demand and/or fuel flow occurs at a time of approximately t_0. In response to the increase in demand and/or fuel flow, a controller (e.g., the controller 460), provides power to an electric compressor unit (e.g., the electric motor 440 and compressor 424) to thereby boost air pressure and hence air flow to an internal combustion engine. Note that in the graph of airflow ($m_A$) with respect to time, the airflow increases nearly instantaneously at approximately time t_0. Thus, the exemplary system 400 may be used to reduce and/or substantially eliminate the delay time associated with the turbocharged system 100. Further note that similar behavior is shown in the graph of power (P) versus time. In addition, corresponding emissions (E) are potentially reduced in response to the increase in demand and/or fuel flow (D/F).

Figure 7:
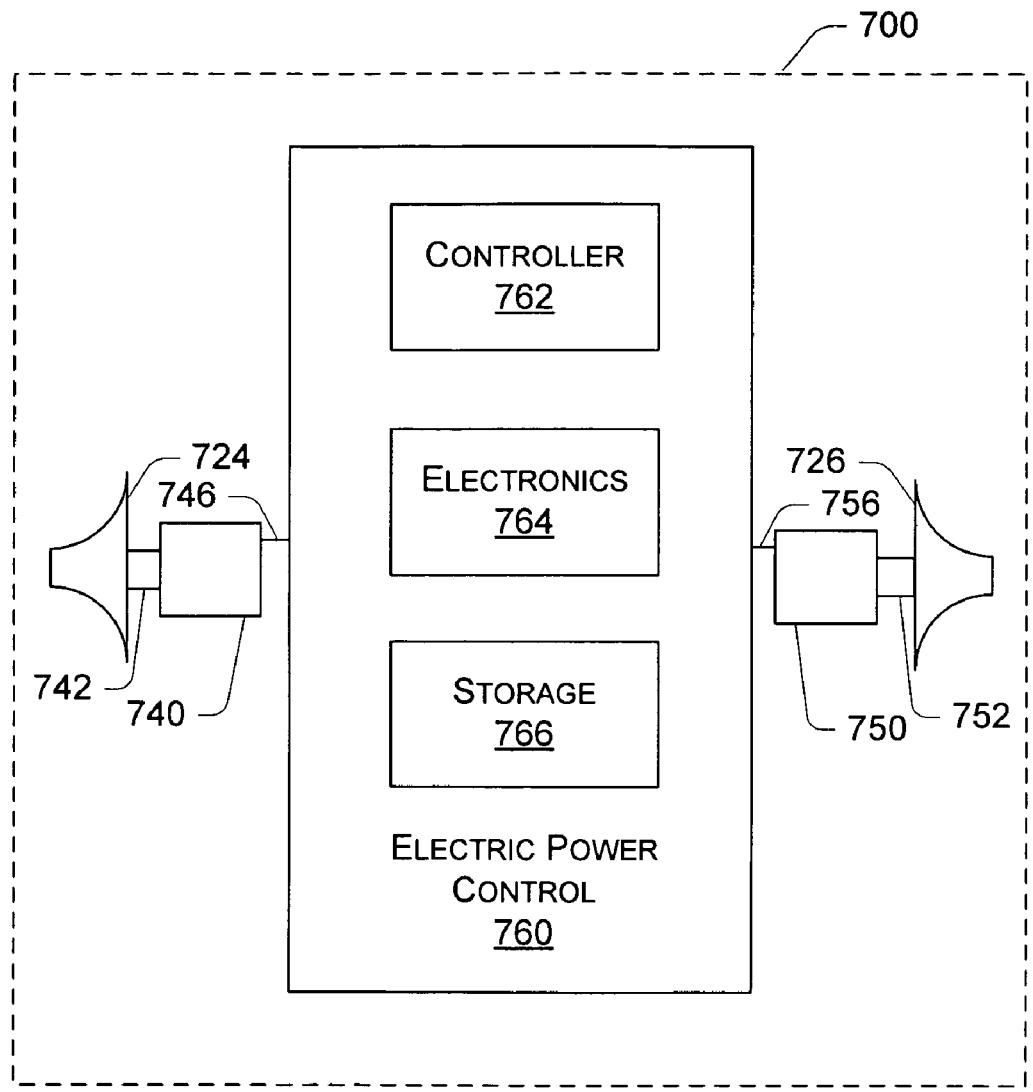
FIG. 7 is a diagram of various components of an electric power control suitable for use in the system of FIG. 4.

Referring to FIG. 7, a block diagram of various components 700, suitable for use in the exemplary system 400, is shown. The exemplary system 700 includes an electric motor 740, an electric generator/motor 750 and an electric control unit 760. The electric control unit 760 includes a controller 762, power electronics 764 and electrical power storage 766. In general, the controller 762 has one or more communication links with the power electronics 764 and/or the electrical power storage 766. Such links optionally allow for control of the power electronics 764 and/or the power storage 766 via the controller 762. Further, the controller 762 may control input of power from the electric generator/motor 750 via the link 752 and/or output of power from the electric control unit 760 to the electric motor 740 via the link 742. An exemplary controller may also include a switch for switching operation of an electric motor from a power storage (e.g., the power storage 766) to another power source. A switch may alternatively, or in addition to, allow for recharging of a power storage. For example, after depletion of a power storage to a predetermined power storage level, a switch may switch to another power source to power an electric motor and/or recharge the power storage. Of course, the generator/motor 750 may act as another power source. Regarding the predetermined power storage level, this level optionally depends on factors such as cycle time, total cycles, lifespan, charge/discharge characteristics, etc. Such a level is optionally programmed and/or determined by a controller and/or other device.

An exemplary controller (e.g., the controller 762) may also include an input for receiving information pertaining to operation of an internal combustion engine. Further, such a controller may include control logic and/or other determination means for determining, based at least in part on the information, whether to boost intake charge pressure supplied to the internal combustion engine. Additional control logic and/or control means may then direct electrical power from a power storage to an electric compressor upon a determination to boost and/or direct electrical power generated by an electric turbine to the electric compressor after the determination to boost and upon a depletion of the power storage to a predetermined power storage level.

As already mentioned, a motor for a compressor optionally operates at a voltage of approximately 12 V to approximately 600 V or more. In general, operational voltages exceed those typically used in a conventional vehicle's electrical system (e.g., non-hybrid). Further, the power available in a typical vehicle's electrical system may not adequately meet power demands of some motors suitable for use with a compressor.

An exemplary power storage (e.g., the power storage 766) includes one or more capacitors and/or batteries. In general, such capacitors and/or batteries are capable of providing an electric motor (e.g., the motor 740) with power sufficient to increase intake charge pressure. In general, batteries tend to have longer charge times when compared to capacitors. One type of capacitor, sometimes referred to as "super capacitors", includes high energy capacitors and high power capacitors. Suitable supercapacitors, individually or grouped, may be capable of producing voltages from several volts to over 600 volts, may be capable of more than 100,000 cycles, and may be rated at more than approximately 1 kJ. Various exemplary systems described herein optionally include supercapacitors for power storage. In addition, various exemplary systems include a power storage that is isolated from a vehicle's primary electrical system and/or a power storage that operates at a voltage level higher than a vehicle's primary electrical system.

Where a vehicle is a hybrid that relies at least in part on an electric motor for propulsion, such a vehicle may have an associated electrical system that operates at a voltage substantially above 12 V or 24 V. For example, some hybrid vehicles include an electrical system that operates at a voltage around 480 V. As discussed with respect to the system 400 of FIGS. 4 and 5, various exemplary technology disclosed herein is suitable for use with hybrid vehicles.

An exemplary power storage, controller or power electronics may also include circuitry, such as, but not limited to, rectifier circuitry and voltage multiplier circuitry, to rectify current and increase voltage, respectively. For example, rectifier circuitry may operate to rectify an alternating current to a direct current and voltage multiplier circuitry may operate by charging capacitors in parallel and discharging capacitors in series. Of course, a motor for a compressor and/or a generator (and/or motor) for a turbine may include a power storage and/or circuitry. Further, a turbine coupled to a generator may produce sufficient on-line power to operate an electric compressor directly (e.g., optionally via rectifier circuitry) and thereby allow for bypassing a power storage.

Referring again to FIG. 6, an exemplary intake charge boost system may require only up to a few seconds or so of compressor operation to reduce lag. Therefore, power storage, controller and/or power electronics are optionally designed to operate intermittently to provide a compressor with bursts of power, for example, wherein each burst does not exceed approximately 10 seconds. Of course, power storage, controller and/or power electronics for longer bursts (e.g., greater than approximately 10 seconds) and/or shorter bursts (e.g., less than approximately 10 seconds) are also possible.

An exemplary method may include start-up through use of stored power (e.g., capacitor and/or battery) followed by use of on-line power from a turbine generator. In such an exemplary method, stored power is used for only a few seconds (e.g., approximately 2 seconds to approximately 3 seconds). Consider an exemplary method that includes discharging one or more capacitors to power an electric compressor for approximately 3 seconds and switching to on-line power from an electric turbine operating as a generator, or alternatively, switching to another capacitor or group of capacitors. In the latter example, an on-line electric turbine operating as a generator optionally charges one or more capacitors while one or more other capacitors are being discharged.

Use of more than one turbine and/or more than one compressor may allow for enhanced performance. For example, multiple compressors may operate in stages depending on performance requirements. Further, multiple compressors may operate together simultaneously or individually on a selective basis (e.g., based on demand). In addition, one turbine may provide enough electrical power to drive more than one compressor or more than one turbine may provide electrical power for one compressor. Of course a variety of other configurations are possible through use of one or more compressors and/or one or more turbines.

Figure 8:
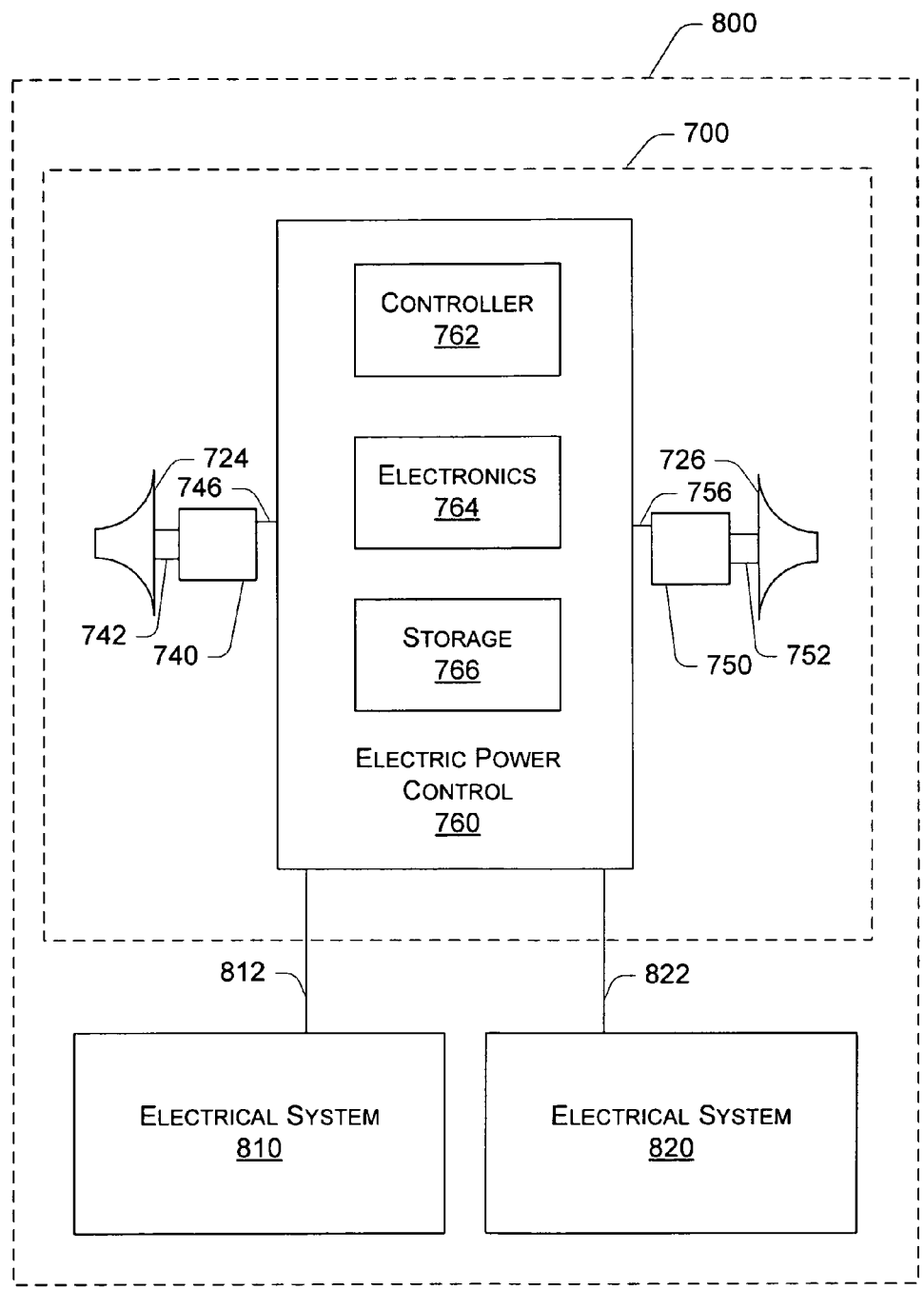
FIG. 8 is a diagram of various components of an electric power control and one or more electrical systems.

Referring to FIG. 8, a block diagram of the exemplary system 700 of FIG. 7 is shown along with one or more electrical system blocks 810, 820. As shown in FIG. 8, the electrical system block 810 optionally corresponds to an electrical system operating at a voltage and power sufficient to run one or more electric compressor units (e.g., the electric motor 740 coupled to the compressor 724); whereas the electrical system block 820 optionally corresponds to an electrical system operating at a voltage and power sufficient to run a vehicle's other electrical needs (e.g., glow plugs, ignition, starter motor, lights, computer, etc.).

As shown in FIG. 8, a link 812 exists between the electric control unit 760 and the electrical system block 810 and another link 822 exists between the electric control unit 760 and the electrical system block 820. The link 812 and/or the link 822 typically operate to communicate information and/or power related to operation of an electric compressor unit and/or an electric turbine unit (e.g., the generator 750 coupled to the turbine 726). For example, a vehicle's primary electrical system (e.g., associated with one or more batteries used for electrical needs) optionally provides power via the link 822 to operate a controller (e.g., the controller 762) or the like, which, in turn, controls power associated with an electrical system that operates at a higher voltage than the vehicle's primary electrical system. Of course, power generated by an electric turbine unit optionally generates power for control and for powering one or more electric compressor units. In such an exemplary system, a rectifier or the like optionally converts time variant voltage to one or more DC voltages, wherein one voltage may power control and another voltage powers a motor associated with an electric compressor unit.

Referring again to the set of graphs 100 of FIG. 6, in a typical turbocharger and internal combustion engine system, a demand for increased power usually results in an increase in fuel flow to the engine; however, upon an increase in fuel flow, combustion efficiency may be limited by inadequate airflow. In response to the increase in fuel flow, however, heat release does increase, which, in turn, typically increases exhaust temperature and engine back-pressure. In response, the turbine is able to extract some additional energy from the exhaust, which, in turn, increases power to the compressor. In such a system, while the turbocharger's shaft speed increases, speed is resisted in part by turbine and/or compressor inertia (i.e., the turbine and compressor are typically attached to the same shaft). In spite of such resistance, an increase in shaft speed typically occurs, which causes the compressor to increase airflow to the engine thereby providing a more adequate airflow for a given fuel flow. Again, this process often results in a condition known as "turbo lag". As already mentioned, various exemplary methods, devices, and/or systems described herein optionally operate to reduce and/or eliminate conditions such as, but not limited to, turbo lag.

In an exemplary boost and/or generation system, such as the system 400 of FIGS. 4 and 5, an electric compressor unit and an electric turbine unit include respective shafts that can rotate at the same or at different speeds. Such a system allows each shaft to rotate at a speed different from that of another shaft(s). Indeed, shafts may rotate at speeds independent from one another. In addition, turbine and compressor inertia are essentially decoupled. Thus, compressor size, weight, etc., are optionally determined independent of turbine size, weight, etc. and vice versa. For example, a compressor associated with an electric compressor unit is optionally larger and more efficient than a compressor associated with a shaft and turbine assembly (e.g., a compressor associated with the turbocharger unit 120 of FIG. 1).

Figure 9:
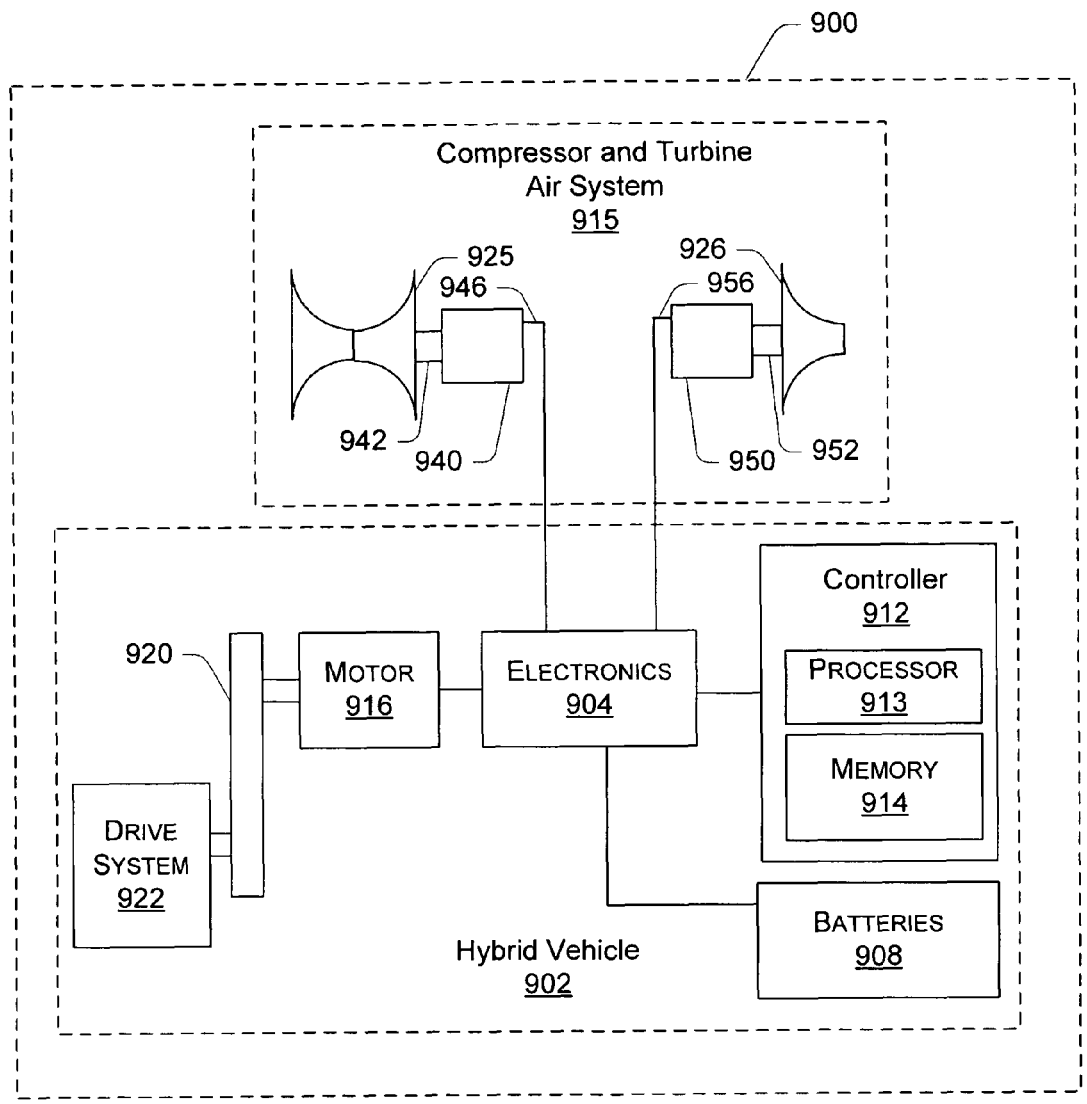
FIG. 9 is a diagram of an exemplary system applied to a hybrid vehicle.

FIG. 9 shows an exemplary hybrid vehicle system 900. In particular, the system 900 is a modular, electrically linked air system 915 for a full hybrid vehicle 902. The air system 915 includes a two wheel compressor 925 coupled to a motor 940 via a shaft 942 and a turbine 926 coupled to a generator 950 via a shaft 952. The generator 950 may optionally be a motor and a generator. The air system 915 includes at least one link 946, 956 to electronics 904 of the hybrid vehicle 902.

The hybrid vehicle 902 additionally includes batteries 908 for storing electrical energy, a controller 912 (e.g., a computing device) coupled to the electronics 904 for controlling operation of various components of the system 900, an electric motor 916 coupled to a transmission 920 that is further coupled to a drive system 922.

This boosting system 915 added to a full hybrid vehicle is synergistic as various components of the system 915 can be integrated within the hybrid system 902. For example, as shown in FIG. 9, implementation of the compressor and turbine air system requires linkage to the electronics 904 of the hybrid vehicle 902 and control modification, for example, to the controller 912.

In general, the controller 912 includes a processor 913 and memory 914 for storing instructions executable through use of the processor 913. Control logic may be programmed as instructions suitable for storage in memory 914 and executable through use of the processor 913 and thereby allow for control of various aspects of operation of the hybrid vehicle 902 and the associated compressor and turbine air system 915. Control logic or algorithms may address a variety of issues such as, but not limited to, those discussed with respect to the graphs of FIG. 6.

Various exemplary systems disclosed herein can be used to generate high pressure ratios to achieve high engine power levels or full load exhaust gas recirculation (EGR). Such situations typically require a wide flow range for compressors and turbines. Use of a compressor decoupled from a turbine allows for operational characteristics that differ from those of a conventional, mechanically coupled turbocharger system.

Various exemplary systems disclosed herein can be used to alleviate exhaust restriction. Such situations typically result in poor transient response and may stem from selection of a less than optimal turbine. Again, use of a compressor decoupled from a turbine allows for operational characteristics that differ from those of a conventional, mechanically coupled turbocharger system.

Various exemplary systems disclosed herein can be used to address low air to fuel ratios and high EGR that occur at less than full loading of an engine. Such situations typically result in poor transient response. Use of a compressor decoupled from a turbine allows for operational characteristics that differ from those of a conventional, mechanically coupled turbocharger system.

Various exemplary systems disclosed herein can be used to downsize engine requirements for economy and to reduce $CO_2$ emissions. Use of a compressor decoupled from a turbine allows for operational characteristics that differ from those of a conventional, mechanically coupled turbocharger system.

As already mentioned, use of a compressor driven by an electric motor decoupled from a turbine allows each to operate at optimum speed and thereby alleviate issues such as compressor and turbine mismatch. Further, turbine inertia is not a significant factor in turbo acceleration, thus the turbine can be made larger and more efficient.

Hybrid vehicles are driving development of some of technologies that can be advantageously used for integration of an exemplary decoupled compressor/turbine system (e.g., the system 400). Hybrid vehicles include power electronics, sophisticated power management control, high power automotive motors and generators. Further, many rely on higher voltages (e.g., 100 to 600 V), which can allow for use of more efficient motors to drive a compressor.

An exemplary system that includes an electric motor driven compressor decoupled mechanically from a turbine can provide for turbocompounding. For example, energy generated through use of a generator coupled to an exhaust turbine can be used to power a motor coupled to a vehicle's drivetrain. In such an example, the turbine can extract maximum work from the exhaust regardless of the work requirement of the compressor. Any excess work generated by the turbine driven generator can be electrically routed to the vehicle drivetrain.

Through the addition of another subsystem, a battery to recharge the ultra-capacitor when the generator cannot, the system adds the capability of "idle stop" normally associated with a "mild hybrid" system. For example, an idle stop system may shut off the internal combustion engine of a vehicle (e.g., halt fuel supply, ignition, etc.) when the vehicle comes to a stop (e.g., a stop light, stop sign, etc.). Through use of stored energy, an electric motor (e.g., an integrated starter alternator or other configured electric motor) can act to propel the vehicle and/or to help start the internal combustion engine.

Figure 10:
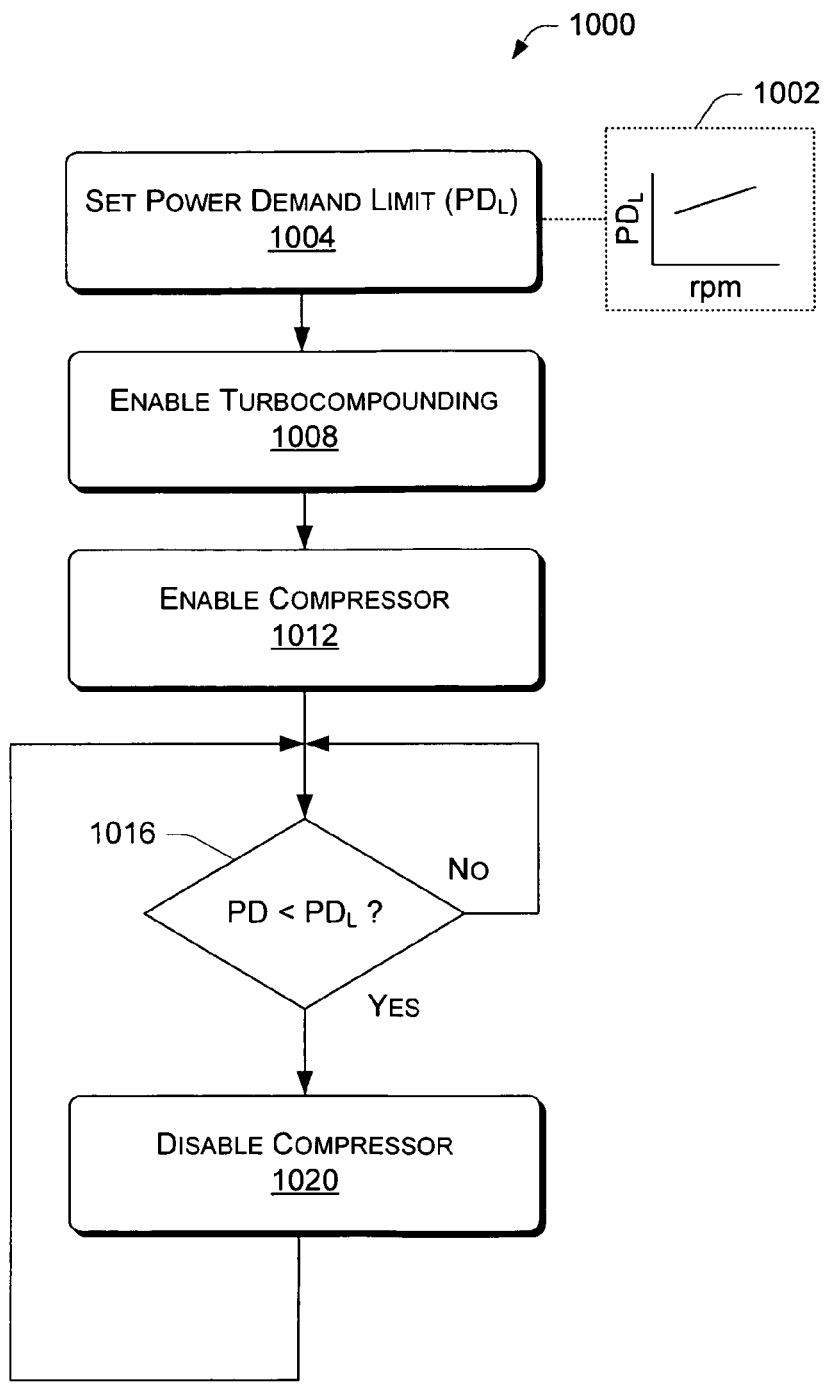
FIG. 10 is a block diagram of an exemplary method for disabling use of a compressor driven by an electric motor.

FIG. 10 shows an exemplary method 1000 that may be implemented programmed as instructions suitable for storage in memory and executable through use of a processor. The method 1000 commences in a set block 1004 that sets a power demand limit ($PD_L$). The set block 1004 may operate automatically, be set by a manufacturer, set by a user, etc. The plot 1002 shows an example where $PD_L$ is a function of rpm of an internal combustion engine. An enablement block 1008 enables turbocompounding, which may be controlled in response to various operational conditions. Another enablement block 1012 enables use of a compressor operably driven by an electric motor. The compressor may be controlled in response to various operational conditions.

The method 1000 focuses on a single operational condition, power demand or load. A decision block 1016 decides if the power demand (PD) is less than the power demand limit ($PD_L$). If the decision block 1016 decides that PD is not less than $PD_L$, then the method 1000 continues, for example, at an operational step or entry point prior to the decision block 1016. However, if the decision block 1016 decides that PD is less than $PD_L$, then the method 1000 continues in a disablement block 1020 that disables use of the compressor. Thereafter, the method 1000 continues, for example, at an operational step or entry point prior to the decision block 1016. The decision block 1016 may optionally initiate control action related to the turbine or turbocompounding. For example, the decision block 1016 may cause an adjustment to geometry of a variable geometry unit of a turbine (see, e.g., 495) that thereby affects the amount of energy extracted by the turbine from an exhaust stream.

In general, for power demand less than a power demand limit, use of the compressor may not provide substantial power advantages and/or may be disadvantageous as to overall efficiency. Thus, instead of expending energy to power a compressor, energy may be extracted through use of a turbine and stored and/or used to power a motor coupled to a drivetrain. Consider an example where a normally aspirated internal combustion engine produces 100 HP at 1500 rpm. Through use of a conventional turbocharger or a compressor driven by an electric motor, such an engine may be able to produce 200 HP at 1500 rpm. According to the method 1000, a power demand limit ($PD_L$) may be set to such an engine's normally aspirated power, i.e., $PD_L$ may be set to 100 HP. In this example, if the operational PD is 50 HP, the normally aspirated power rating is sufficient to supply the demand. Consequently, energy extracted by the turbine may be better used for powering a motor coupled to a drivetrain rather than for powering an intake air compressor. Such an exemplary method can improve fuel efficiency for power demands less than the set power demand limit, which may correspond to a normally aspirated power.

The aforementioned parameter $PD_L$ may be dependent on one or more factors (rpm, etc.). For example, plot 1002 indicates that $PD_L$ is a function of rpm. A user optionally has an ability to control $PD_L$ setting via a suitable user interface (knob, vehicle computer, etc.).

Various exemplary systems allow for selection of a turbine that can more efficiently extract energy from an exhaust stream than a turbine of a conventional turbocharger. In particular, where a turbine wheel is decoupled mechanically from a compressor wheel, the turbine may be selected to more efficiently extract energy from an exhaust stream. Further, as already mention, various systems may include a turbine without a compressor (e.g., an electrically turbocompounded internal combustion engine without a compressor for intake air).

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system for an internal combustion engine comprising:
   an exhaust turbine operably coupled to a generator;
   an intake air compressor operably coupled to an electric motor and mechanically decoupled from the exhaust turbine;
   an additional electric motor;
   a linkage to link the additional electric motor to a drivetrain drivable by the internal combustion engine; and
   a controller to direct electricity generated by the generator to one or more members of the group consisting of the electric motor, the additional electric motor, and a power storage.

2. The system of claim 1 wherein the controller comprises a power demand parameter that corresponds to power demand of the internal combustion engine.

3. The system of claim 2 wherein the controller comprises a power demand limit parameter that corresponds to a normally, aspirated power of the internal combustion engine.

4. The system of claim 3 wherein the power demand limit depends at least in part on rpm of the internal combustion engine.

5. The system of claim 3 wherein the controller directs electricity to the electric motor based at least in part on the power demand parameter and the power demand limit parameter.

6. The system of claim 1 wherein the turbine comprises a variable geometry turbine and wherein the controller controls the geometry of the variable geometry turbine.

7. The system of claim 1 wherein the compressor comprises a variable geometry compressor wherein the controller controls the geometry of the variable geometry compressor.

8. The system of claim 1 wherein the compressor comprises more than one compressor stage.

9. The system of claim 1 wherein the controller comprises a processor and memory.

10. The system of claim 9 wherein the controller comprises instructions recorded on a data recording medium and executable by the processor.

11. The system of claim 1 wherein the controller comprises control logic to direct electricity to the additional motor at the end of an idle period of the internal combustion engine.

12. The system of claim 1 wherein the controller directs electricity stored in the power storage to one or more members of the group consisting of the electric motor and the additional electric motor.

13. A system for a normally aspirated internal combustion engine of a hybrid vehicle, the system comprising:
    an exhaust turbine operably coupled to a generator wherein the exhaust turbine comprises a variable geometry turbine;
    an electric motor;
    a linkage to link the electric motor to a drivetrain drivable by the normally aspirated internal combustion engine; and
    a controller to direct electricity generated by the generator to one or more members of the group consisting of the electric motor and a power storage and to control the geometry of the variable geometry turbine.

14. A hybrid vehicle comprising:
    a system for an internal combustion engine that comprises an exhaust turbine operably coupled to a generator;
    an intake air compressor operably coupled to an electric motor and mechanically decoupled from the exhaust turbine;
    an additional electric motor;
    a linkage to link the additional electric motor to a drivetrain drivable by the internal combustion engine; and
    a controller to direct electricity generated by the generator to one or more members of the group consisting of the electric motor, the additional electric motor, and a power storage.

* * * * *